(12) United States Patent
Liu et al.

(10) Patent No.: US 11,428,623 B2
(45) Date of Patent: Aug. 30, 2022

(54) HIGH TEMPERATURE CORROSION SENSOR

(71) Applicant: West Virginia University Board of Governors on behalf of West Virginia University, Morgantown, WV (US)

(72) Inventors: Xingbo Liu, Morgantown, WV (US); Tianliang Zhao, Shanghai (CN); Greg Collins, Morgantown, WV (US)

( * ) Notice: Subject to any disclaimer, the term of this patent is extended or adjusted under 35 U.S.C. 154(b) by 68 days.

(21) Appl. No.: 17/247,648

(22) Filed: Dec. 18, 2020

(65) Prior Publication Data
US 2021/0190674 A1 Jun. 24, 2021

Related U.S. Application Data

(60) Provisional application No. 62/951,459, filed on Dec. 20, 2019.

(51) Int. Cl.
| | |
|---|---|
| *G01N 17/04* | (2006.01) |
| *G01N 27/02* | (2006.01) |
| *G01N 27/04* | (2006.01) |
| *G01N 17/00* | (2006.01) |

(52) U.S. Cl.
CPC .......... *G01N 17/04* (2013.01); *G01N 17/006* (2013.01); *G01N 27/021* (2013.01); *G01N 27/041* (2013.01)

(58) Field of Classification Search
CPC .... G01N 17/006; G01N 17/04; G01N 27/021; G01N 27/041
See application file for complete search history.

(56) References Cited

U.S. PATENT DOCUMENTS 6,628,111 B2 * 9/2003 Shapiro ............... G01N 17/006
324/71.2

FOREIGN PATENT DOCUMENTS

| CN | 107462616 A | * 12/2017 |
| ES | 2573178 | 6/2016 |
| KR | 20190065556 A | 6/2019 |
| WO | 94/12862 | 6/1994 |

\* cited by examiner

*Primary Examiner* — Jay Patidar
(74) *Attorney, Agent, or Firm* — Buchanan Ingersoll & Rooney PC; Craig G. Cochenour, Esq.

(57) ABSTRACT

A high temperature corrosion sensor is provided having (i) a housing having an external wall and an internal wall, the internal wall of the housing forming a chamber of the housing, (ii) a stainless steel tube inserted into the chamber, (iii) a ceramic tube wherein at least a portion of the ceramic tube is inserted into the stainless steel tube, (iv) an airflow tube that extends through the chamber, and (v) a sensor probe having a first working electrode, a second working electrode, a reference electrode, a positive electrical resistance, a negative electrical resistance, and a thermocouple, wherein at least a portion of each are encapsulated into a ceramic casting that is located at one end of the housing. Methods of measuring corrosion within a power plant environment are provided.

25 Claims, 14 Drawing Sheets
(5 of 14 Drawing Sheet(s) Filed in Color)

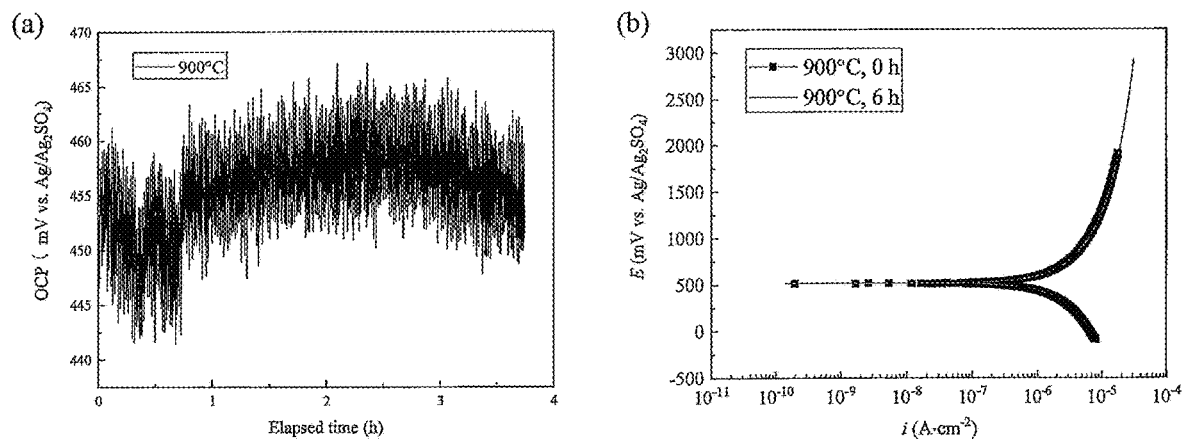
Fig. 6 (a) and Fig. 6(b)

HIGH TEMPERATURE CORROSION SENSOR

CROSS-REFERENCE TO RELATED APPLICATION

This utility non-provisional patent application claims the benefit of priority to U.S. Provisional Patent Application Ser. No. 62/951,459, filed Dec. 20, 2019. The entire contents of U.S. Provisional Patent Application Ser. No. 62/951,459 is incorporated by reference into this utility non-provisional patent application as if fully rewritten herein.

STATEMENT REGARDING FEDERALLY SPONSORED RESEARCH OR DEVELOPMENT

This invention was made with government support under Grant Nos. DE-FE0031548, and DE-FE0005717, awarded by the Department of Energy. The government has certain rights in the invention.

BACKGROUND OF THE INVENTION

1. Field of the Invention

The present invention relates to a high temperature corrosion sensor. More preferably, this invention provides a high temperature electrochemical sensor and a high temperature corrosion sensor system for in-situ corrosion monitoring in coal-based power generation boilers.

2. Description of the Background Art

The previous methods for monitoring corrosion in high temperature environments include online techniques and offline technologies.

The previous methods for monitoring corrosion in high temperature environment mainly include online techniques and offline techniques. Currently, offline techniques, such as weight loss coupons [1, 2] and a variety of flaw detection technologies [3], are more common to be applied in industrial scale since they can get more accurate and reliable information about corrosion. For weight loss coupons, samples of the same material as the corroded metals are usually used to in situ install at the place where corrosion most occurs. They often need to be collected in part or in total after regular durations. Apparently, offline techniques also have defects. They usually take long time and cannot tell events timely. All the information they reflect are limited to the post mortem measurements and analysis.

The online techniques are mostly based on the principle of electrical resistance (ER) [4, 5] and some electrochemical methods, such as linear polarization resistance (LPR) [6], electrochemical impedance spectrum (EIS) [7], galvanic corrosion (GC)[8], electrochemical noise (ECN) [9, 10], ER corrosion sensors can provide an accurate but only basic measurement of cross-sectional loss in situ. They cannot reflect the corrosion detail during monitoring. LPR and EIS techniques both need to apply a small voltage shift from OCP to the electrode. It induces that a stable and reliable RE is required during measurement and the corrosion medium must have good conductivity. Moreover, the small voltage shift can actually exert an impact on the corrosion process. The GC principle collects the corrosion information by measuring the galvanic current between the target metal and another exotic metal. The selection of exotic metal is critically important to the measurement precision and the polarization induced by galvanic coupling may also change the corrosion mechanism. ECN is an in-situ technique which can tell both the corrosion rate and the corrosion details such as corrosion mechanism and corrosion type. However, ECN cannot measure the accurate corrosion rate though has a close relation with it. Besides, like other electrochemical methods, ECN also needs a reliable RE. In high temperature region (above 600° C.), a pseudo RE was generally applied to the on-site and laboratory corrosion monitoring based on electrochemical methods [11-15]. Only Naing Aung used a self-made $Ag/Ag^+$/fused-quartz RE as the real RE in his high-temperature corrosion sensor [9]. However, his RE can only work in laboratory at a relatively steady temperature between 700° C. and 800° C. and so does his corrosion senor [16]. That induces the corrosion sensor cannot really simulate the actual condition in field. Lack of a cooling system or temperature-control system not only limits the application of high-temperature corrosion sensor in field but also reduces their service life. This invention addresses the above disadvantages of prior art by incorporating a thermocouple, a ER element and a ECN module together in one corrosion sensor as well as adding a cooling device or a temperature-control system.

SUMMARY OF THE INVENTION

A high temperature corrosion sensor is provided comprising: (i) a housing having a first end and a second end and a middle section disposed between said first end of said housing and said second end of said housing, said housing having an external wall and an internal wall, said internal wall of said housing forming a chamber of said housing, and an airflow opening located on said external wall of said housing and extending through said internal wall of said housing and into said chamber, (ii) a stainless steel tube having a first open end and a second open end, and a middle section disposed between said first open end and said second open end of said stainless steel tube, wherein at least a portion of said stainless steel tube is located within said housing, (iii) a ceramic tube having a first open end and a second open end, and a middle section disposed between said first open end and said second open end of said ceramic tube, wherein said second open end of said ceramic tube and said middle section of said ceramic tube is inserted into said first end of said stainless steel tube, through said middle section of said stainless steel tube, and through the second end of said stainless steel tube, such that the second end of said ceramic tube) extends out of and beyond said second end of said stainless steel tube and wherein said first open end of said ceramic tube extends out of and beyond said first end of said stainless steel tube, and wherein said middle section of said ceramic tube is located within said middle section of said stainless steel tube, (iv) an airflow tube having a first open end and a second open end, and a middle section disposed between said first open end and said second open end of said air flow tube, wherein said second open end of said air flow tube extends through said first end of said housing, through said chamber of said housing, and into second end of said housing, and wherein said first end of said air flow tube is located outside of said external wall of said first end of said housing, and (v) a sensor probe located within said second end of said housing wherein said sensor probe comprises a first working electrode, a second working electrode, a reference electrode, a positive electrical resistance, a negative electrical resistance, and a thermocouple , wherein said thermocouple is inserted into a ceramic casting wherein said ceramic casting is located at the second end of said housing, and wherein said first working electrode is in communication with a first working electrode wire, wherein said second working electrode is in communication with a second working electrode wire, wherein said reference electrode is in communication with a reference electrode wire, wherein a positive electrical resistance wire is in communication with said first working electrode, wherein a negative electrical resistance wire is in communication with said working electrode, and wherein a thermocouple wire is in communication with said thermocouple, and wherein a portion of each of said first working electrode wire, said second working electrode wire, said thermocouple wire, said positive electrical resistance wire, and said negative electrical resistance wire are located in an interior of said middle section of said ceramic tube.

In another embodiment of this invention, a high temperature corrosion sensor, as described herein, includes wherein said reference electrode is a tube having a first closed end and a second end open, wherein said tube of said reference electrode contains an electrolyte and a silver rod inserted into said tube and surrounded by said electrolyte of said tube of said reference electrode, and wherein said second open end of said reference electrode tube is then sealed with a ceramic paste sealed in a vacuum.

In another embodiment of this invention, a high temperature corrosion sensor, as described herein, includes wherein said electrolyte of said reference electrode is a mixture of a $Ag_2SO_4$ powder and a $Na_2SO_4$ powder.

In another embodiment of this invention, a high temperature corrosion sensor, as described herein, includes wherein said tube of said reference electrode is made of a material selected from the group consisting of a mullite, an alumina, and a quartz.

In another embodiment of this invention, a high temperature corrosion sensor, as described herein, includes wherein said ceramic paste for sealing said open end of said reference electrode is an alumina paste.

In another embodiment of this invention, a high temperature corrosion sensor, as described herein, includes wherein said ceramic casting is made of one of a silica powder, or a zirconia powder, or a mixture of said silica powder and said zirconia powder.

In another embodiment of this invention, a high temperature corrosion sensor, as described herein, includes wherein at least a portion of each of said first working electrode, said second working electrode, said reference electrode, and said thermocouple are within said ceramic casting.

In another embodiment of this invention, a high temperature corrosion sensor, as described herein, includes wherein said ceramic casting encapsulates at least a portion of each of said first working electrode, said second working electrode, said reference electrode, and said thermocouple.

In another embodiment of this invention, a high temperature corrosion sensor, as described herein, includes wherein each of said first working electrode wire, said second working electrode wire, said thermocouple wire, said positive electrical resistance wire, and said negative electrical resistance wire are made of a heat-resistant material.

In another embodiment of this invention, a high temperature corrosion sensor, as described herein, includes wherein said heat-resistant material is a nichrome wire.

In another embodiment of this invention, a high temperature corrosion sensor, as described herein, includes wherein said thermocouple has a thermocouple cap at one end to protect the thermocouple.

In another embodiment of this invention, a high temperature corrosion sensor, as described herein, includes wherein said reference electrode is made from a one-end closed and a second end open mullite tube, quartz tube, or a ceramic tube, wherein said tube of said reference electrode contains an electrolyte of a mixture of a $Age SO4$ powder and a $Na2SO4$ powder and a silver rod inserted into said electrolyte of said reference electrode tube, and wherein said second open end of said reference electrode tube is then sealed with a ceramic paste sealed in a vacuum.

In an embodiment of this invention, a high temperature corrosion sensor system is provided comprising: (A) a high temperature corrosion sensor comprising: (i) a housing having a first end and a second end and a middle section disposed between said first end of said housing and said second end of said housing, said housing having an external wall and an internal wall, said internal wall of said housing forming a chamber of said housing, and an airflow opening located on said external wall of said housing and extending through said internal wall of said housing and into said chamber, (ii) a stainless steel tube having a first open end and a second open end, and a middle section disposed between said first open end and said second open end of said stainless steel tube, wherein at least a portion of said stainless steel tube is located within said housing, (iii) a ceramic tube having a first open end and a second open end, and a middle section disposed between said first open end and said second open end of said ceramic tube, wherein said second end of said ceramic tube and said middle section of said ceramic tube is inserted into said first end of said stainless steel tube, through said middle section of said stainless steel tube, and through the second end of said stainless steel tube, such that the second end of said ceramic tube extends out of and beyond said second end of said stainless steel tube and wherein said first open end of said ceramic tube extends out of and beyond said first end of said stainless steel tube , and wherein said middle section of said ceramic tube is located within said middle section of said stainless steel tube, (iv) an airflow tube having a first open end and a second open end, and a middle section disposed between said first open end and said second open end of said air flow tube, wherein said second open end of said air flow tube extends through said first end of said housing, through said chamber of said housing, and into second end of said housing, and wherein said first end of said air flow tube is located outside of said external wall of said first end of said housing, and (v) a sensor probe located within said second end of said housing wherein said sensor probe comprises a first working electrode, a second working electrode, a reference electrode, a positive electrical resistance, a negative electrical resistance, and a thermocouple, wherein said thermocouple is inserted into a ceramic casting wherein said ceramic casting is located at the second end of said housing; (B) a temperature based airflow controller, and (C) a data collector comprising a voltmeter, an ammeter, a resistance meter, and a thermometer, and wherein said voltmeter, said ammeter, said resistance meter, and said thermometer are each in communication with a computer processor, and wherein said first working electrode is in communication with said voltmeter and said ammeter via a first working electrode wire, wherein said second working electrode is in communication with said ammeter via a second working electrode wire, wherein said reference electrode is in communication with said voltmeter via a reference electrode wire, wherein a positive electrical resistance wire is in communication with a first working electrode and said resistance meter, wherein a negative electrical resistance wire is in communication with said second working electrode and said resistance meter, and wherein a thermocouple wire is in communication with said thermocouple and said thermometer and said temperature based airflow controller, and wherein a portion of each of said first working electrode wire, said second working electrode wire, said thermocouple wire, said positive electrical resistance wire, and said negative electrical resistance wire are located in an interior of said middle section of said ceramic tube; and optionally (D) a source of compressed air in communication with said temperature based airflow controller and said first open end of said air flow tube.

Another embodiment of this invention provides a method of measuring corrosion in a boiler comprising inserting a high temperature corrosion sensor, as described herein, in an environment of a boiler, wherein said corrosion sensor is as provided and described herein, and measuring a level of corrosion within said boiler using a high temperature corrosion sensor system, as described herein.

In yet another embodiment of this invention, a method is provided for measuring corrosion in one or more pipes of a water-fall or super-heater of an electric power factory comprising inserting a high temperature corrosion sensor into the environment of one or more pipes of a water-fall or super-heater of an electric power plant, wherein said high temperature corrosion sensor is as provided and described herein, and measuring a level of corrosion within one or more pipes of said water-fall or super-heater of said electric power factory using said high temperature corrosion sensor system, as is provided and described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee. As the color drawings are being filed electronically via EFS-Web, only one set of the drawings is submitted.

FIG. 6a shows the OCP curve of 347 SS (stainless steel) measured with Ag/Ag2SO4 RE (reference electrode) in coal ash.

FIG. 6b shows the PDP curve of 347 SS measured with Ag/Ag2SO4 RE in coal ash.

DETAILED DESCRIPTION OF THE INVENTION

Figure 1:
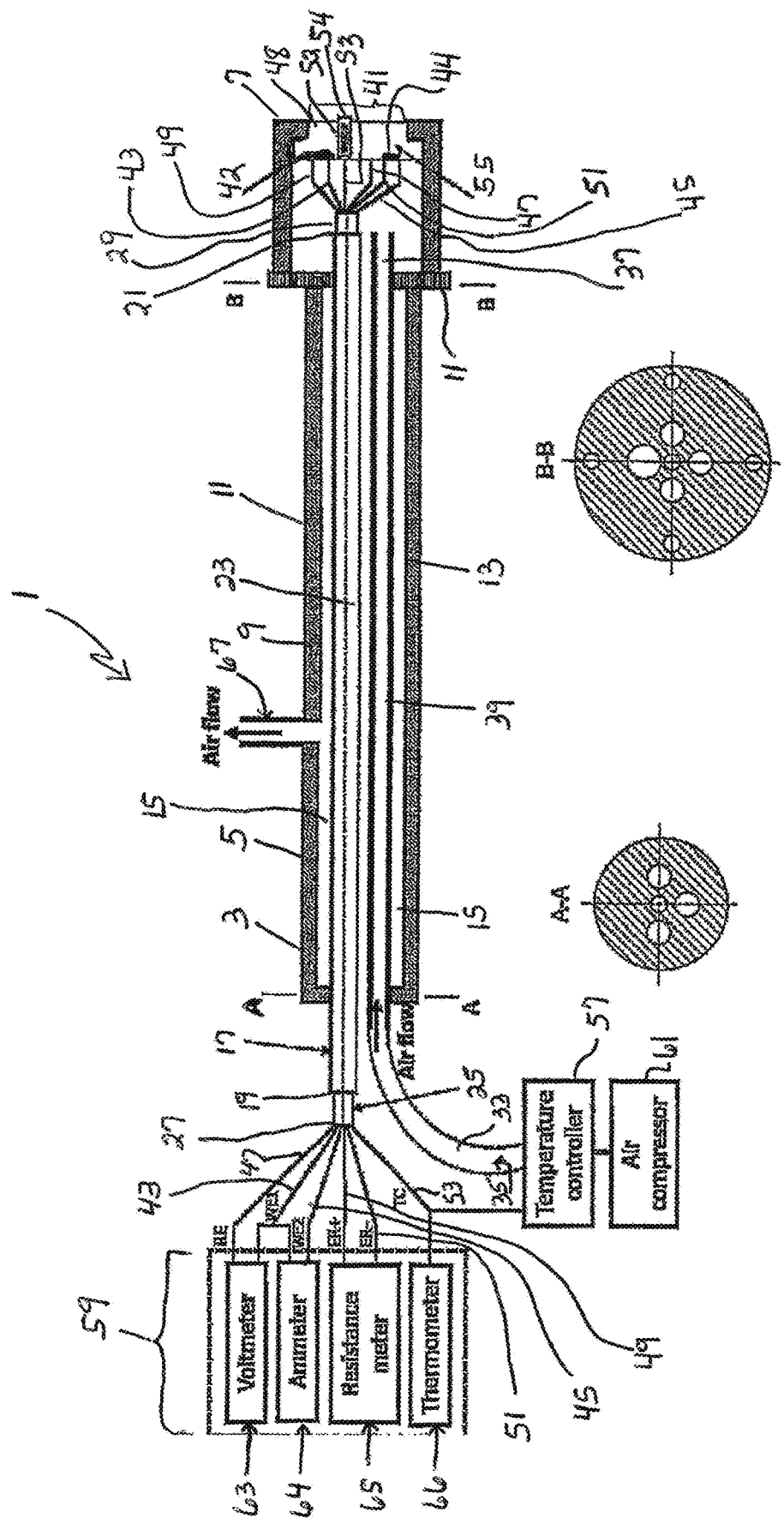
FIG. 1 is a schematic showing the structure of the high temperature corrosion sensor and the high temperature corrosion sensor system of this invention.
Figure 11:
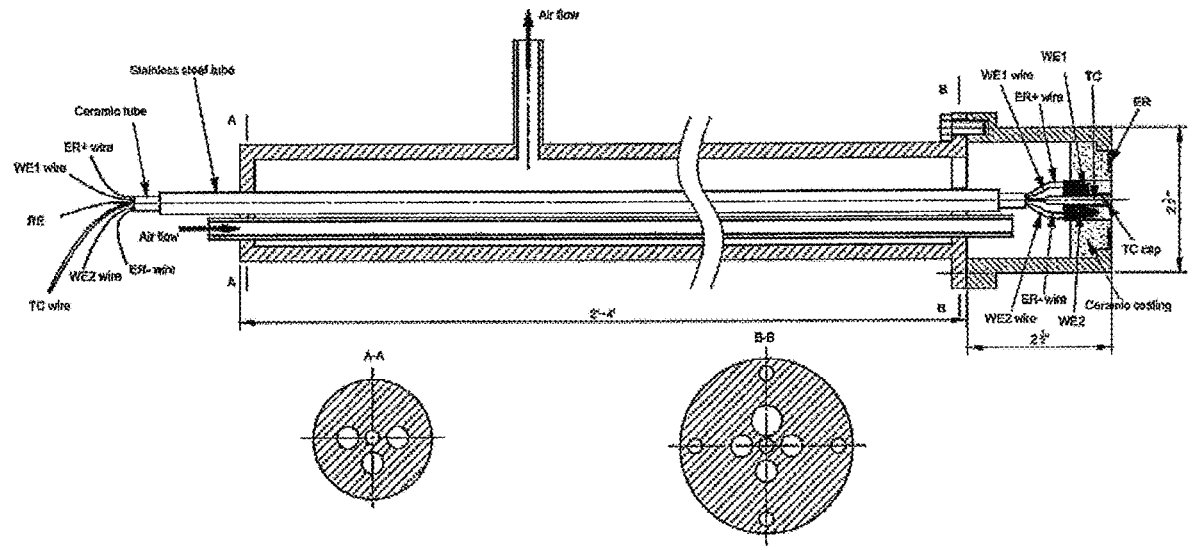
FIG. 11 shows a schematic of a longitudinal view (not symmetric) of the corrosion sensor (i.e. the corrosion sensor probe) of this invention.
Figure 12:
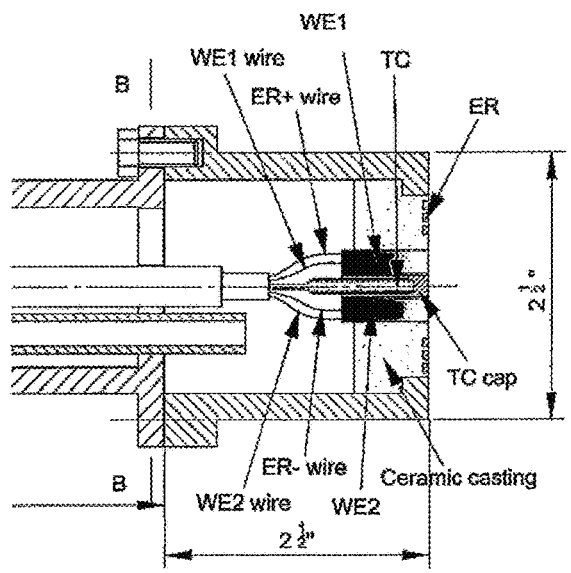
FIG. 12 shows a schematic of an off-center longitudinal view (not symmetric) of the corrosion sensor "head" at the second end of the corrosion sensor housing of the corrosion sensor of this invention.

In one embodiment of this invention, a high temperature corrosion sensor is provided, as set forth in at least one of the figures, including FIG. 1, FIG. 11, and FIG. 12 (second end of said corrosion sensor), comprising: (i) a housing (3) having a first end (5) and a second end (7) and a middle section (9) disposed between said first end (5) of said housing (3) and said second end (7) of said housing (3), said housing (3) having an external wall (11) and an internal wall (13), said internal wall (13) of said housing (3) forming a chamber (15) of said housing (3), and an airflow opening (67) located on said external wall (11) of said housing (3) and extending through said internal wall (13) of said housing (3) and into said chamber (15), (ii) a stainless steel tube (17) having a first open end (19) and a second open end (21), and a middle section (23) disposed between said first open end (19) and said second open end (21) of said stainless steel tube (17), wherein at least a portion of said stainless steel tube (17) is located within said housing (3), (iii) a ceramic tube (25) having a first open end (27) and a second open end (29) , and a middle section (31, not shown) disposed between said first open end (27) and said second open end (29) of said ceramic tube (25), wherein said second end (29) of said ceramic tube (25) and said middle section (31, not shown) of said ceramic tube (25) is inserted into said first end (19) of said stainless steel tube (17), through said middle section (23) of said stainless steel tube (17), and through the second end (21) of said stainless steel tube (17), such that the second end (29) of said ceramic tube (25) extends out of and beyond said second end (21) of said stainless steel tube (17) and wherein said first open end (27) of said ceramic tube (25) extends out of and beyond said first end (19) of said stainless steel tube (17), and wherein said middle section (31, not shown) of said ceramic tube (25) is located within said middle section (23) of said stainless steel tube (17), (iv) an airflow tube (33) having a first open end (35) and a second open end (37), and a middle section (39) disposed between said first open end (35) and said second open end (37) of said air flow tube (33), wherein said second open end (37) of said air flow tube (33) extends through said first end (5) of said housing (3), through said chamber (15) of said housing (3), and into second end (7) of said housing (3), and wherein said first end (35) of said air flow tube (33) is located outside of said external wall (11) of said first end of (5) of said housing (3), and (v) a sensor probe (41) located within said second end (7) of said housing (3) wherein said sensor probe (41) comprises a first working electrode (WE1) (42), a second working electrode (WE2) (44), a reference electrode (RE) (46, not shown), a positive electrical resistance (ER+) (70, not shown), a negative electrical resistance (ER−) (72, not shown), and a thermocouple (TC)(52), wherein said thermocouple (52) is inserted into a ceramic casting (55) wherein said ceramic casting (55) is located at the second end (7) of said housing (3), and wherein said first working electrode (42) is in communication with a first working electrode wire (43), wherein said second working electrode (44) is in communication with a second working electrode wire (45), wherein said reference electrode (46, not shown) is in communication with a reference electrode wire (47), wherein a positive electrical resistance wire (49) is in communication with said first working electrode (42), wherein a negative electrical resistance wire (51) is in communication with said working electrode (44), and wherein a thermocouple wire (53) is in communication with said thermocouple (52), and wherein a portion of each of said first working electrode wire (43), said second working electrode wire (45), said thermocouple wire (53), said positive electrical resistance wire (49), and said negative electrical resistance wire (51) are located in an interior (32, not shown) of said middle section (31, not shown) of said ceramic tube (25). Reference numerals and identifiers are generally used in the figures, and as set forth, for example, in FIG. 1.

In another embodiment of this invention, a high temperature corrosion sensor, as described herein, includes wherein said reference electrode is a tube having a first closed end and a second end open, wherein said tube of said reference electrode contains an electrolyte and a silver rod inserted into said tube and surrounded by said electrolyte of said tube of said reference electrode, and wherein said second open end of said reference electrode tube is then sealed with a ceramic paste sealed in a vacuum.

In another embodiment of this invention, a high temperature corrosion sensor, as described herein, includes wherein said electrolyte of said reference electrode is a mixture of a $Ag_2SO_4$ powder and a $Na_2SO_4$ powder.

In another embodiment of this invention, a high temperature corrosion sensor, as described herein, includes wherein said tube of said reference electrode is made of a material selected from the group consisting of a mullite, an alumina, and a quartz.

In another embodiment of this invention, a high temperature corrosion sensor, as described herein, includes wherein said ceramic paste for sealing said open end of said reference electrode is an alumina paste.

In another embodiment of this invention, a high temperature corrosion sensor, as described herein, includes wherein said ceramic casting is made of one of a silica powder, or a zirconia powder, or a mixture of said silica powder and said zirconia powder.

In another embodiment of this invention, a high temperature corrosion sensor, as described herein, includes wherein at least a portion of each of said first working electrode, said second working electrode, said reference electrode, and said thermocouple are within said ceramic casting.

In another embodiment of this invention, a high temperature corrosion sensor, as described herein, includes wherein said ceramic casting encapsulates at least a portion of each of said first working electrode, said second working electrode, said reference electrode, and said thermocouple.

In another embodiment of this invention, a high temperature corrosion sensor, as described herein, includes wherein each of said first working electrode wire, said second working electrode wire, said thermocouple wire, said positive electrical resistance wire, and said negative electrical resistance wire are made of a heat-resistant material.

In another embodiment of this invention, a high temperature corrosion sensor, as described herein, includes wherein said heat-resistant material is a nichrome wire.

In another embodiment of this invention, a high temperature corrosion sensor, as described herein, includes wherein said thermocouple has a thermocouple cap at one end to protect the thermocouple.

In another embodiment of this invention, a high temperature corrosion sensor, as described herein, includes wherein said reference electrode is made from a one-end closed and a second end open mullite tube, quartz tube, or a ceramic tube, wherein said tube of said reference electrode contains an electrolyte of a mixture of a $Ag_2SO_4$ powder and a $Na_2SO_4$ powder and a silver rod inserted into said electrolyte of said reference electrode tube, and wherein said second open end of said reference electrode tube is then sealed with a ceramic paste sealed in a vacuum.

In another embodiment of this invention, a high temperature corrosion sensor system (1) is provided, as set forth in at least FIG. 1, comprising: (A) a high temperature corrosion sensor comprising (i) a housing (3) having a first end (5) and a second end (7) and a middle section (9) disposed between said first end (5) of said housing (3) and said second end (7) of said housing (3), said housing (3) having an external wall (11) and an internal wall (13), said internal wall (13) of said housing (3) forming a chamber (15) of said housing (3), and an airflow opening (67) located on said external wall (11) of said housing (3) and extending through said internal wall (13) of said housing (3) and into said chamber (15), (ii) a stainless steel tube (17) having a first open end (19) and a second open end (21), and a middle section (23) disposed between said first open end (19) and said second open end (21) of said stainless steel tube (17), wherein at least a portion of said stainless steel tube (17) is located within said housing (3), (iii) a ceramic tube (25) having a first open end (27) and a second open end (29), and a middle section (31, not shown) disposed between said first open end (27) and said second open end (29) of said ceramic tube (25), wherein said second end (29) of said ceramic tube (25) and said middle section (31, not shown) of said ceramic tube (25) is inserted into said first end (19) of said stainless steel tube (17), through said middle section (23) of said stainless steel tube (17), and through the second end (21) of said stainless steel tube (17), such that the second end (29) of said ceramic tube (25) extends out of and beyond said second end (21) of said stainless steel tube (17) and wherein said first open end (27) of said ceramic tube (25) extends out of and beyond said first end (19) of said stainless steel tube (17), and wherein said middle section (31, not shown) of said ceramic tube (25) is located within said middle section (23) of said stainless steel tube (17), (iv) an airflow tube (33) having a first open end (35) and a second open end (37), and a middle section (39) disposed between said first open end (35) and said second open end (37) of said air flow tube (33), wherein said second open end (37) of said air flow tube (33) extends through said first end (5) of said housing (3), through said chamber (15) of said housing (3), and into second end (7) of said housing (3), and wherein said first end (35) of said air flow tube (33) is located outside of said external wall (11) of said first end of (5) of said housing (3), and (v) a sensor probe (41) located within said second end (7) of said housing (3) wherein said sensor probe (41) comprises a first working electrode (42), a second working electrode (44), a reference electrode (46, not shown), a positive electrical resistance (70, not shown), a negative electrical resistance (72, not shown), and a thermocouple 52), wherein said thermocouple (52) is inserted into a ceramic casting (55) wherein said ceramic casting (55) is located at the second end (7) of said housing (3); (B) a temperature based airflow controller (57), and (C) a data collector (i.e. a data computer acquisition system) comprising a voltmeter (63), an ammeter (64), a resistance meter (65), and a thermometer (66), wherein said voltmeter (63), said ammeter (64), said resistance meter (65), and said thermometer (66) are each in communication with a computer processor (not shown), and wherein said first working electrode (42) is in communication with said voltmeter (63) and said ammeter (64) via a first working electrode wire (43), wherein said second working electrode (44) is in communication with said ammeter (64) via a second working electrode wire (45), wherein said reference electrode (46, not shown) is in communication with said voltmeter (63) via a reference electrode wire (47), wherein a positive electrical resistance wire (49) is in communication with a first working electrode (42) and said resistance meter (65), wherein a negative electrical resistance wire (51) is in communication with said second working electrode (44) and said resistance meter (65), and wherein a thermocouple wire (53) is in communication with said thermocouple (52) and said thermometer (66) and said temperature based airflow controller (57), and wherein a portion of each of said first working electrode wire (43), said second working electrode wire (45), said thermocouple wire (53), said positive electrical resistance wire (49), and said negative electrical resistance wire (51) are located in an interior (32, not shown) of said middle section (31, not shown) of said ceramic tube (25), and optionally (D) a source of compressed air (61) in communication with said temperature based airflow controller (57) and said first open end (35) of said air flow tube (33).

Another embodiment of this invention provides a method of measuring corrosion in a boiler comprising inserting a high temperature corrosion sensor in an environment of a boiler, wherein said high temperature corrosion sensor is as provided and described herein, and measuring a level of corrosion within said boiler using said high temperature corrosion sensor system, as is provided and described herein.

In yet another embodiment of this invention, a method is provided for measuring corrosion in one or more pipes of a water-fall or super-heater of an electric power factory comprising inserting a high temperature corrosion sensor into the environment of one or more pipes of a water-fall or super-heater of an electric power plant, wherein said high temperature corrosion sensor is as provided and described herein, and measuring a level of corrosion within said pipes of said water-fall or super-heater of said electric power factory using said high temperature corrosion sensor system, as provided and described herein.

The reference electrode (RE) is made from a one-end closed and a second end open tube, wherein said tube of said reference electrode contains an electrolyte of a mixture of a $Ag_2\ SO_4$ powder and a $Na_2SO_4$ powder and a silver rod inserted into said electrolyte of said reference electrode tube, and wherein said second open end of said reference electrode tube is then sealed with a ceramic paste sealed in a vacuum. In a preferred embodiment of this invention, the reference electrode tube may be made of mullite, quartz, or a ceramic material.

In one embodiment of this invention, the high temperature corrosion sensor system includes a data collector (i.e. a data computer acquisition system) comprising a voltmeter (63), an ammeter (64), a resistance meter (65), and a thermometer (66), each in communication with a computer processor (not shown). The data computer collection system (i.e. data collector) is employed that is capable of reading the high temperature corrosion sensor's I/O signals. For example, but not limited to, such a data collection system is available from Aspinity, Pittsburgh, Pa., USA. In an example of a working prototype of this invention, the Aspinity data computer acquisition system was used with the high temperature corrosion sensor of this invention.

As used herein, the term "high temperature" refers to a temperature of from about 400 degrees Centigrade to about 1000 degrees Centigrade.

As used herein, the term "low temperature" refers to a temperature below about 400 degrees Centigrade.

The waterwall and superheater tubes and the like usually suffer from the corrosion induced by melting coal ash in high-temperature coal-fired environments, such as coal-based boilers or furnaces. Regular maintenances to stop the boiler and take an inspection must be scheduled to see if those tubes need to be fixed or replaced, which raises the cost of maintaining the boiler. Moreover, unexpected rapid corrosion caused by unknown reasons would not be detected before sudden failure of the waterfall tubes and the superheater tubes. To address these problems in the industry, and fulfill long but unmet needs, the present invention provides a high temperature corrosion sensor. In a preferred embodiment of this invention, the high temperature corrosion sensor is a high temperature electrochemical sensor for in-situ corrosion monitoring in a coal-based power generation boiler. Typically, a superheater tube (or a reheater tube) operate under high temperatures, and wherein each are subject to deposit-induced molten salt corrosion. The superheater tubes are generally made of nickel, inconel alloys or fire-resistant stainless steel. Typically, a waterfall tube operates under relatively low temperature, and wherein the waterfall tube is generally made of carbon steel. The corrosion sensor of the present invention is installed at the superheater/reheater of an electric power plant. Preferably, the corrosion sensor of this invention is installed through the observation port near a superheater of a boiler.

Mainly based on the principle of electrochemical noise, we invented a corrosion sensor that can online assess the melt corrosion that occurs in high-temperature environments, such as for example, but not limited to, a coal ash induced corrosion in a ultra-supercritical (USC) coal combustion furnace. The corrosion sensor of this invention provides maintenance inspectors the ability to know how many, how fast and in what type the tubes are corroded at any time. Maintenance can then be scheduled based on the corrosion information provided by the corrosion sensor of this invention. Therefore, the corrosion sensor of this invention could avoid the accidents caused by unexpected corrosion failures, potentially reduce the maintenance frequency, and thereby save maintenance costs.

In a preferred embodiment of this invention, the sensor probe of the high temperature corrosion sensor integrates a three-electrode ECN module, an ER element, and a thermocouple on the top end, which are used to record the ECN signals, the change of resistance, and the temperature of the sensor top end, respectively. The ECN module comprises two identical working electrodes (WE1 and WE2) and one reference electrode (RE). The material of WE1 and WE2 is usually the same as the monitored material. The RE is a real high-temperature reference electrode which provides a reliable and steady reference point for all the electrochemical readings and analysis in a high temperature environment (as defined above). More importantly, in a preferred embodiment of this invention, a cooling device or a temperature-control system is added as an element in the corrosion sensor system of the present invention, providing the corrosion sensor with durably. Therefore, the advantages of the corrosion sensor of this invention, for example but not limited to, are as follows:

The first advantage of the invention is the structural design of the sensor probe, as provided herein. Firstly, we designed an airflow channel for the cooling and temperature control of the sensor top end. Secondly, we designed electric wire channels which could ensure the insulation of electric wires from each other and from the probe body at high temperature. Thirdly, we designed a dismountable sensor head which made the assembly and the repair easy. Fourthly, we provided a clip design on the sensor top end which could stop the ceramic casting, as shown in FIG. 2, FIG. 12, and FIG. 14.

The second advantage of the invention is the temperature-control system. The system uses compressed air as the coolant and an electronic airflow regulator to regulate the flow rate based on temperature feedback from the thermocouple on the sensor top end. This system and the airflow channel enable the temperature of the sensor top end match the target temperature statically or dynamically, as set forth in FIG. 1, FIG. 11, and FIG. 17.

Figure 2:
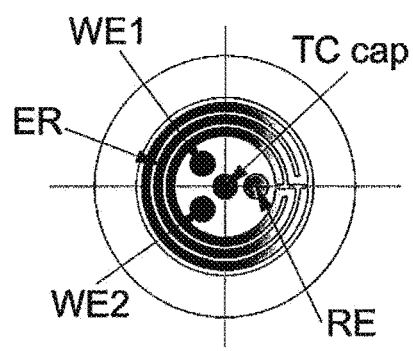
FIG. 2 shows a top view of the top end of the ECN (electrochemical noise) sensor probe of the corrosion sensor of this invention.
Figure 14:
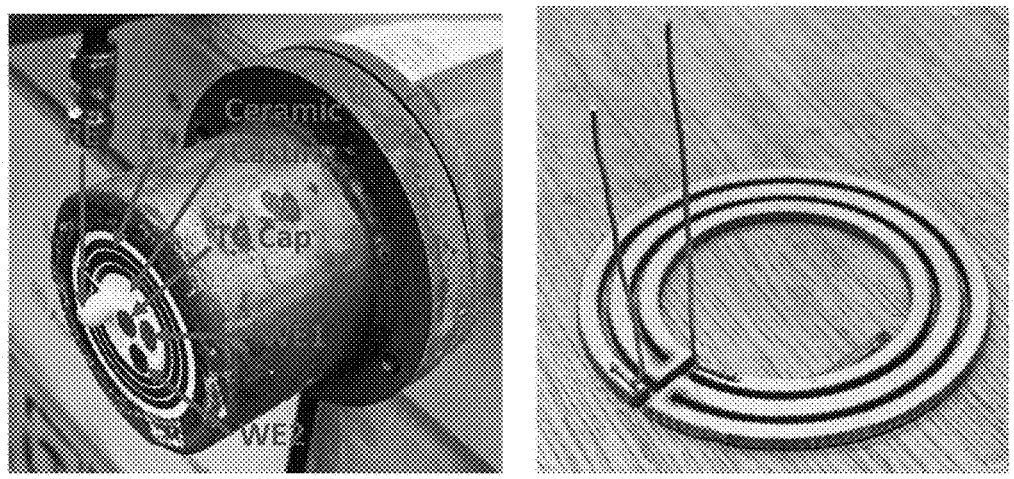
FIG. 14 shows the corrosion sensor "head" at the second end of the corrosion sensor housing (left side of FIG. 14) and the electrical resistor (ER) cast within sensor head (right side of FIG. 14) of the corrosion sensor of this invention.

Another advantage of the invention is that thermocouple, ECN module and ER element are integrated together on the sensor top end, see FIG. 2 and FIG. 14. We buried the thermocouple end in a sample same as the working electrodes to protect it from being broken by outside fire as well as to measure the actual temperature more precisely. The ER element records the resistance change caused by the reduction of cross section due to corrosion. The ECN module records the ECN signals induced by corrosion. Both of the data from them can be converted into corrosion rate. The data from ER element can give a verification and reference to the data from the ECN module.

In one embodiment of this invention, an electronic airflow regulator (see FIG. 1 and FIG. 17) is provided based on temperature feedback for the temperature-control system. The regulator reads the temperature value from the thermocouple of the sensor and adjusts the flow rate based on the difference between the measured temperature and target temperature. The device can realize dynamic regulation to make the temperature of the sensor top end match the actual temperature in real time and control the temperature fluctuation within 5° C.

It will be appreciated by those persons skilled in the art that the high temperature corrosion sensor system and corresponding data processing method of the present invention have a great application prospect in monitoring of the corrosion happens in high-temperature environment, such as the fireside corrosion of waterwall or superheater tubes in coal-based boiler or the molten salt corrosion of melting baths or furnaces. This invention helps reduce the operation and maintenance costs of power plants and electrolytic refineries and the occurrence of failures and accidents.

The invention may be sold, for example, as a corrosion sensor system including a high temperature corrosion sensor (i.e. having the sensor probe as set forth herein), a data collector, and a temperature controller and a set of computer software which can process the data and display them in an easy-reading way.

The ceramic casting powder is commercially available from AREMCO Company, Valley Cottage, N.Y., USA. The electric wires are nichrome wires and commercially available from Sure Pure Chemetals, Inc., Florham, N.Y., USA. The mullite tube for RE is commercially available from Coorstek Company, Golden, Colo., USA.

It will be appreciated that the high temperature corrosion sensor of the present invention provides a cooling system that allows for the adjustment of the working temperature of the corrosion sensor.

It will be appreciated that the high temperature corrosion sensor of the present invention is inserted into a pipe of a waterfall or a super-heater in an electric power factory (plant).

It will be appreciated that a reference electrode is included in the high temperature corrosion sensor of this invention to provide accurate recording of electrochemical noise signals.

FIG. 1 shows the high temperature corrosion sensor of this invention. The ECN sensor probe is one element of the corrosion sensor. The corrosion sensor also includes a temperature-based airflow controller and a data collector. In FIG. 1, the tube which channels the cool compressed air flow into the head of the sensor probe is connected to the temperature-based airflow controller. The airflow rate can be adjusted based on the temperature feedback from TC (thermocouple) to make the temperature of the top end meet the target temperature or match the actual measured temperature. The data collector is used to record and store the data through connnecting to WE1, WE2, TC, ER+, ER−. ER+ and ER− are the two ends of ER. The wires used for connection are heat-resistant nichrome wires. The ceramic tube is used to insulate the nichrome wires from each other and from the stainless steel tubes. The stainless steel tubes sleeve the ceramic tubes to protect them from broken. The ceramic casting was formed and cured before sensor assembling to encapsulate and fix each sensing element.

FIG. 2 shows the arrangement of each sensing element on the top end of the sensor probe. ER is made into a spring-like shape to be as long as possible. Its thickness could be, for example, but not limited to, 1~2 mm. WE1, WE2 and TC cap can both be, for example but not limited to, cylinder-shaped and made of the same material. TC cap is used to protect TC from fireside corrosion or oxidation by inserting TC into it until about 5 mm from the end surface. RE can be made from one-end-closed mullite tube containing electrolyte. The electrolyte can be the well-mixed powder of $Ag_2SO_4$ and $Na_2SO_4$ with ratio of, for example, but not limited to, 1:9. A silver rod of about 2 mm in diameter is inserted into the electrolyte from the open end of the tube. Then the open end is sealed with ceramic paste in a vacuum. The RE must be small enough to be encapsulated on the sensor top end. Length of 3~5 mm of the RE should be exposed over the sensor top end surface. For the sensor installed in Longview boiler, the material of WE1, WE2, ER, and TC cap is 347 stainless steel (SS), which is the same as that of the superheater.

Principle of Data Processing

Figure 3:
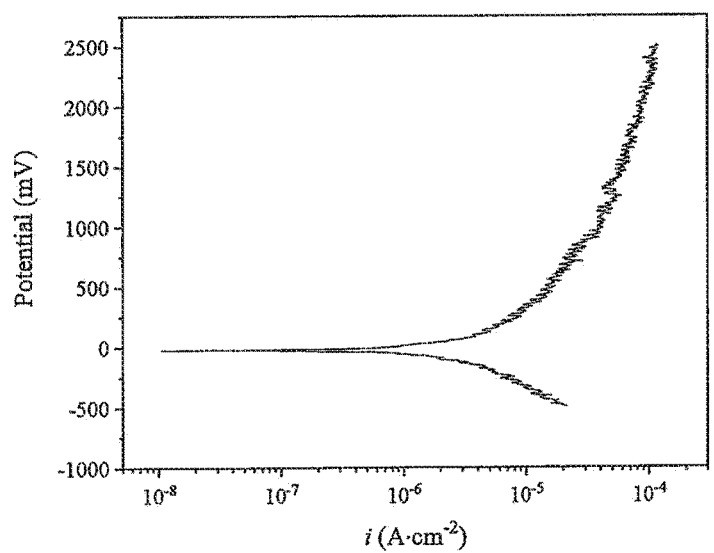
FIG. 3 shows PDF curves of 347 stainless steel at a superheater of a boiler (at Longview Power).

Before the monitoring of ECN signals, the potentiodynamic polarization (PDP) curve was measured by an electrochemical workstation. The result is shown in FIG. 3. It can be seen that the curve doesn't show a passivation characteristic, which means that 347 SS isn't corroded in way of passivation-pitting.

TABLE 1

The fitting parameters of the PDP curves of 347 stainless steel.

| Materials and location | Anodic Tafel slope, α (mV/decade) | Cathodic Tafel slope, β (mV/decade) | Stern-Geary coefficient, B (mV) |
|---|---|---|---|
| 347 SS, Superheater | 810.08 ± 159.98 | 200.49 ± 17.72 | 160.71 |

Then the PDP curves were fitted in the linear region to obtain anodic and cathodic Tafel slope, α and β. Then the Stern-Geary coefficient (B) was calculated through Eq. (1).

$$B = \frac{\alpha \beta}{\alpha + \beta} \quad (1)$$

The fitted and calculated results are listed in Table 1. According to Stern-Geary theory, the corrosion current can then be calculated with the following equation, $$J_{corr} = B/R_p \quad (2)$$

where $R_p$ is the polarization resistance. By introducing the Faraday's law, the corrosion rate can be calculated as follows, $$V_{corr} = \frac{327 \times J_{corr} \times M}{n \times \rho} = \frac{3.27 \times B \times M}{n \times \rho \times R_p} \quad (3)$$

where M is the molar mass, 56 g/mol for Fe, n the electron number freed by the reaction, ρ the materials density. Generally, $R_p$ can be replaced by noise resistance ($R_n$) or spectrum noise resistance ($R_{sn}$), which can be calculated through Eq. (4) and Eq. (5).

$$R_n = \frac{\sigma_v}{\sigma_i} \quad (4)$$

$$R_{sn} = \lim_{f \to 0} \left| \frac{PSD_v}{PSD_i} \right| \quad (5)$$

where $\sigma_v$ and $\sigma_i$ are the standard deviation of potential noise and current noise, respectively, $PSD_v$ and $PSD_i$ the power spectrum density (PSD) curve of potential noise and current noise, respectively, f the frequency. Moreover, the localized degree of corrosion (PI) is calculated with Eq. (6).

$$PI = \frac{\sigma_i}{I_{rms}} \quad (6)$$

where $I_{rms}$ is the root mean square value of current noise. Time dependence of the corroded depth (D) is calculated with following equation.

$$D = \int V_{corr} dt \quad (7)$$

Lab and Field Data and Results

Figure 4:
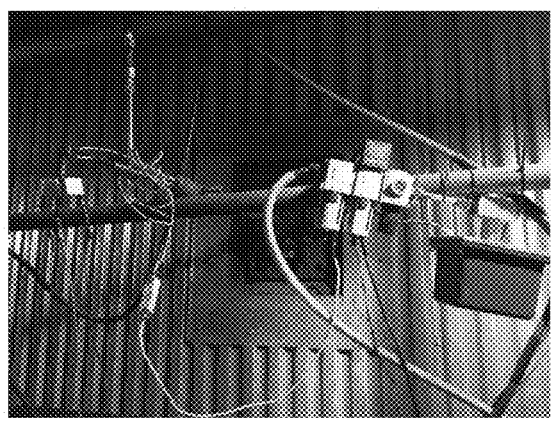
FIG. 4 shows the corrosion sensor of the present invention installed at the superheater of a coal-based boiler (at Longview Power).
Figures 5A, 5B:
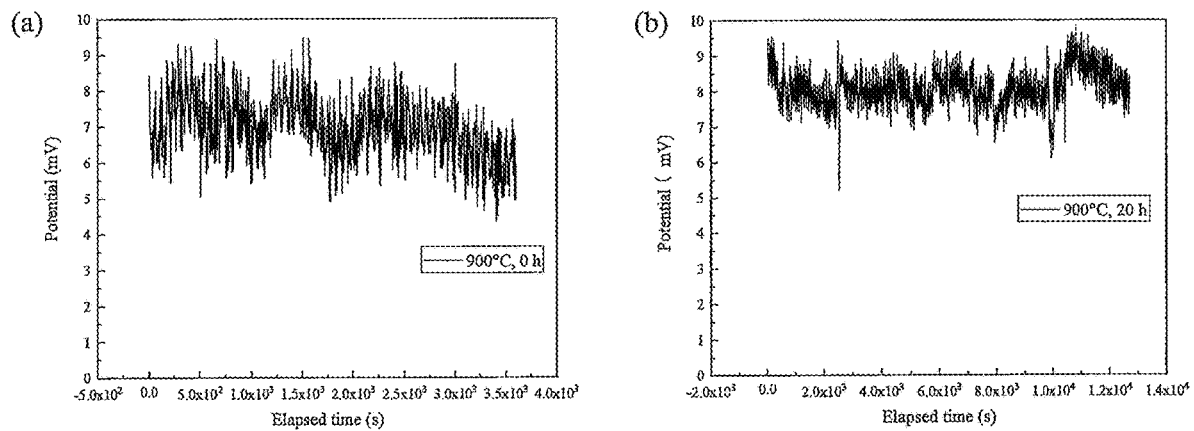
FIG. 5a shows the potential difference between two identical Ag/Ag$_2$SO$_4$/Mullite REs (reference electrodes) after immersed in coal ash at temperature of 900° C. at zero hours.
FIG. 5b shows the potential difference between two identical Ag/Ag$_2$SO$_4$/Mullite REs (reference electrodes) after immersed in coal ash at temperature of 900° C. at 20 hours (h).

FIG. 4 shows the corrosion sensor installed at the superheater place of the coal-based boiler in Longview power plant. The electric power and compressed air are both provided on site. The sensor probe is inserted through an observation door. The temperature at the top end of the sensor probe is controlled to match the actual operational temperature which is around 548° C. In order to ensure reliability of the data, the real REs were tested before use. FIG. 5a shows the potential difference of two identical Ag/Ag$_2$SO$_4$/Mullite REs immersed in coal ash at 900° C. at zero hours and FIG. 5b at 20 hours. It is seen that the potential difference always stays within 10 mV at the beginning or after 20 h. Then the open circuit potential (OCP) and potentiodynamic polarization (PDP) curve of 347 SS were measured with reference to the RE. It is seen from FIG. 5a that the OCP of 347 SS is around 455 mV. FIG. 5b shows that the PDP curve is nearly the same at the initial time and after 6 h. It means that the RE is stable under potentiodynamic polarization.

FIG. 6a shows the OCP and FIG. 6b shows the PDP curve of 347 SS measured with Ag/Ag2SO4 RE in coal ash.

Figure 7:
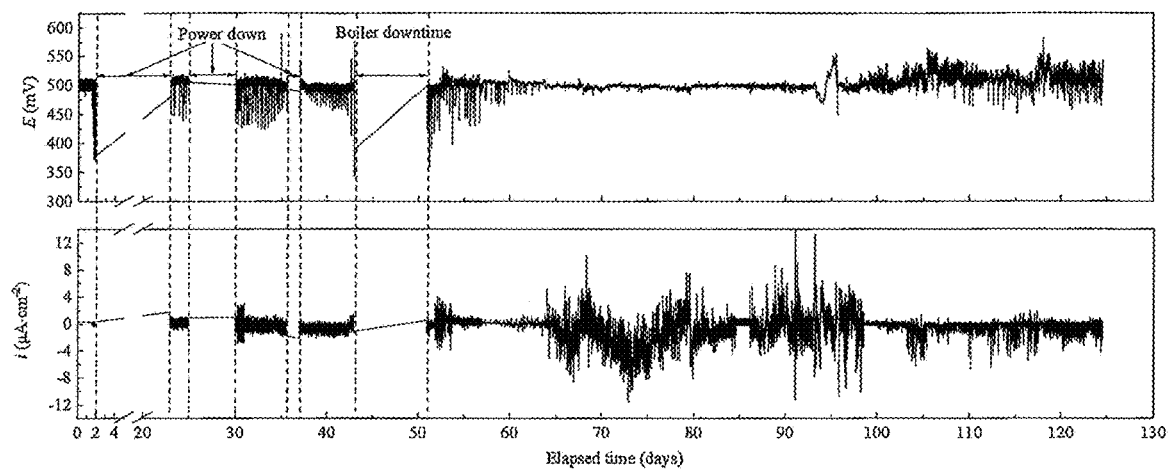
FIG. 7 shows the ECN (electrochemical noise) signals of 347 SS at a superheater of a boiler.
Figure 8:
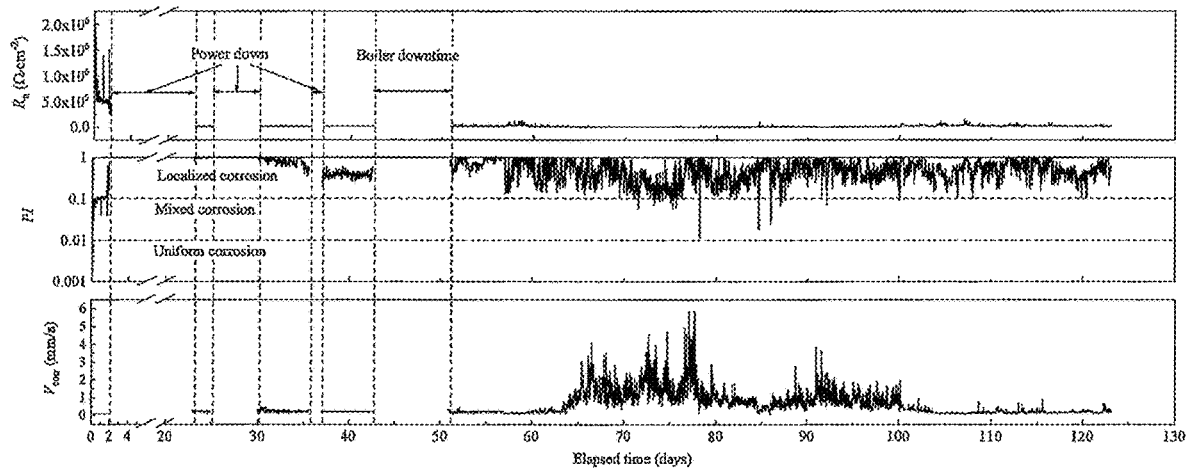
FIG. 8 shows the corrosion indexes including corrosion resistance (Rn), localized index (PI), and corrosion rate (Vcorr) of 347 SS at superheater placement.

FIG. 7 is the ECN signals of 347 SS measured at the superheater place of the coal-based boiler in Longview power plant. It is seen that both potential noise and current noise keep a feature of sharp but very frequent transient peaks, which means the corrosion occurs fast and generally. Each transient peak represents the occurrence of a corrosion pit. Thus, the corrosion form usually turns out to be a uniform corrosion consisting of countless corrosion pits. Whether the corrosion is uniform or not still need to be confirmed with the morphological investigation. By calculating through Eq. (3), Eq. (4) and Eq. (6), we can have time-dependent curves of $R_n$, PI, and $V_{corr}$, as shown in FIG. 8.

From FIG. 8, it can be seen that value of $R_n$ becomes steady at the later stage, which means corrosion reaction becomes stable after the initial fluctuation. The value of PI shows that the corrosion type of 347 SS in the field is localized corrosion during most of the time. And the corrosion rate becomes faster and more unsteady during the days between 60$^{th}$ and 100$^{th}$. That is supposed to be related to the change of operational conditions, such as the change of coal composition and combustion temperature.

Figure 9:
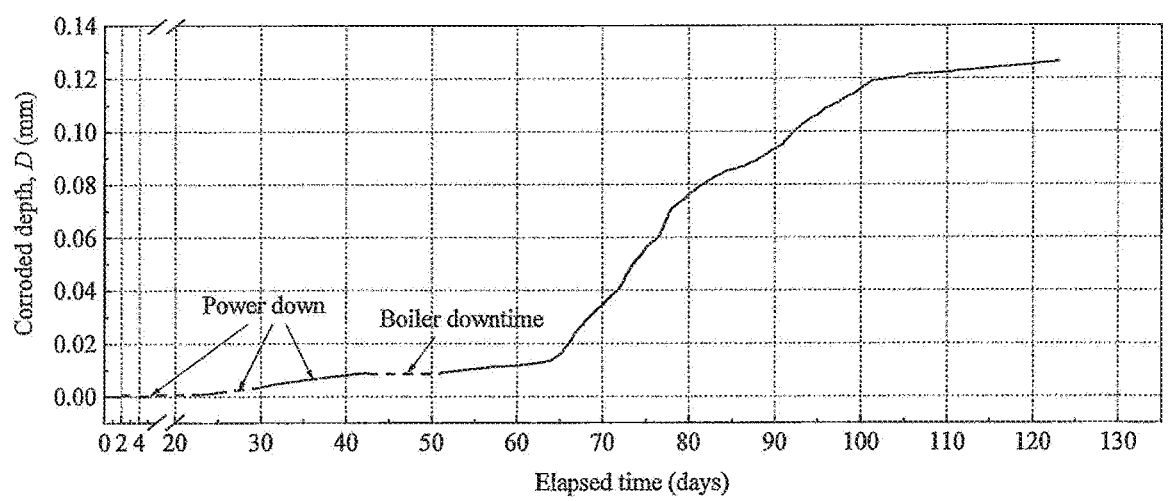
FIG. 9 shows the accumulated corrosion depth of 347 SS at a superheater in a boiler.

Through Eq. (7), the time-dependent curve of corroded depth is obtained, as plotted in FIG. 9. It shows that nearly 0.13 mm was corroded in 123 days, i.e. 1 mm in 2.6 years or 0.38 mm per year. That is quite close to the data Longview provided us, which is 0.2 mm per year. Moreover, the result can be verified and calibrated with reference to the result of weight or thickness loss. Thus, FIG. 9 shows the accumulated corrosion depth of 347 SS at superheater place.

Figure 10:
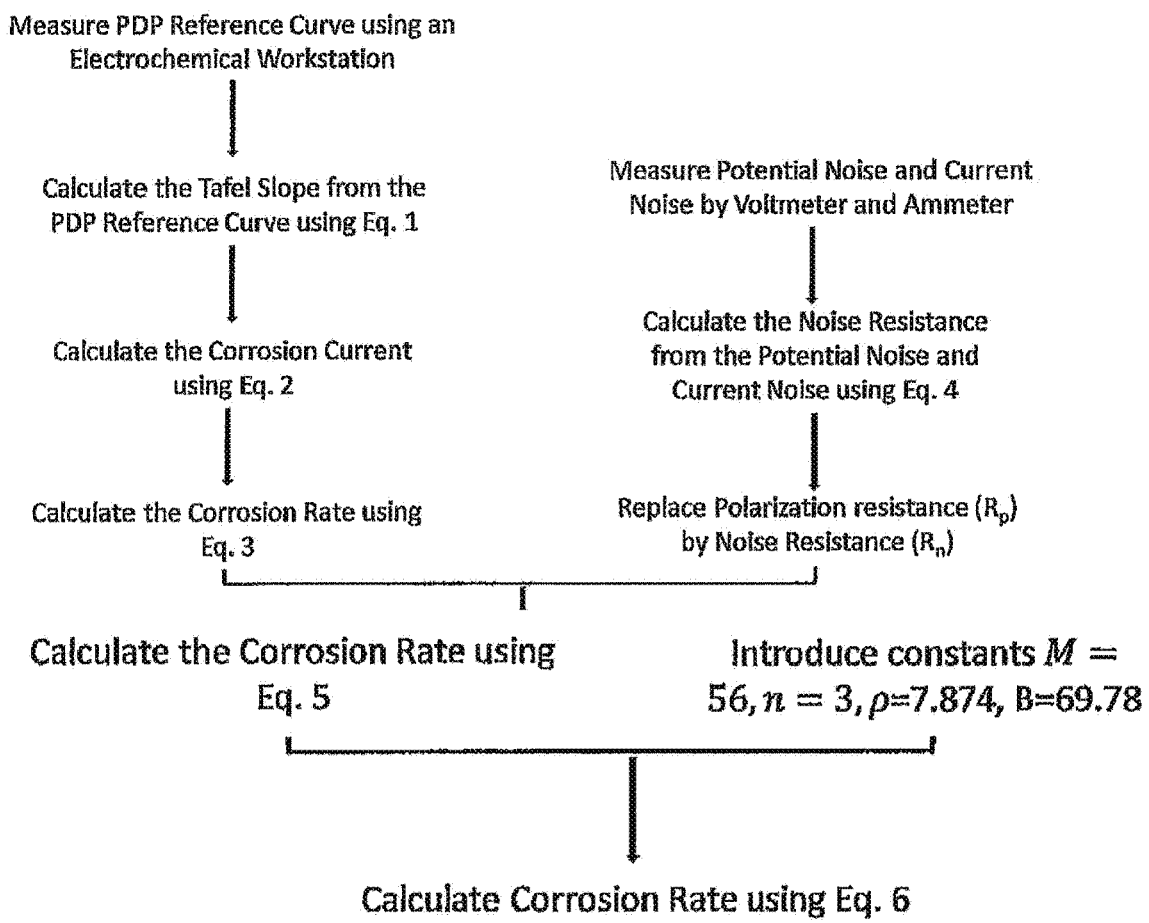
FIG. 10 shows a data acquisition process flow chart.

FIG. 10 shows a data acquisition process flow chart.

FIG. 11 shows a schematic of a longitudinal view (not symmetric) of the corrosion sensor of this invention.

FIG. 12 shows a schematic of a off-center longitudinal view (not symmetric) of the corrosion sensor head. The probe casing is made of stainless-steel tubing. Note the Reference Electrode (RE) that is extended from the sensor head face is not shown.

Figure 13:
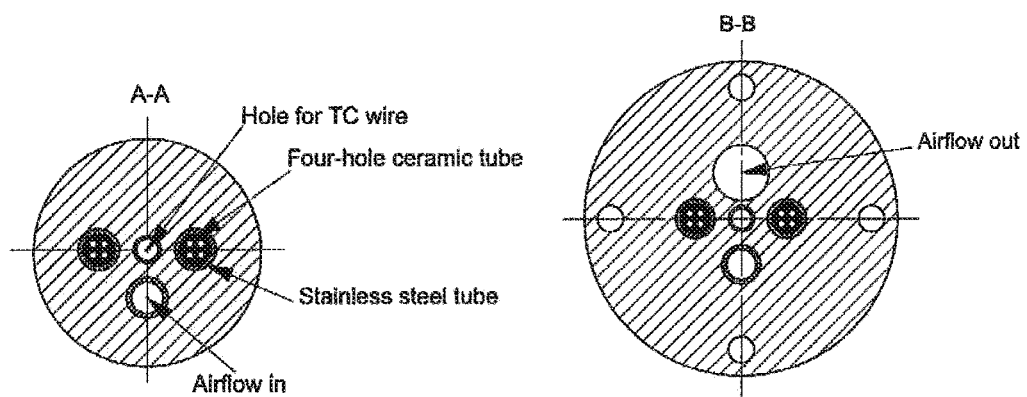
FIG. 13 shows cross sectional views A-A and B-B of FIG. 11.

FIG. 13 shows each circular element represents hole for different purposes. The center hole is a stainless-steel tube to lead and protect the TC wire. The left and right holes are stainless steel tubes jacketing ceramic tubes with four interior channels for leading the sensor wires of WE1, WE2, RE, ER+, and ER−. The sensor wires are 0.02" in diameter and are heat-resistant nichrome. The top and bottom holes are for guiding the air flow into the sensor head and out of the sensor.

FIG. 14 shows the Corrosion Sensor Head (Left), Electrical Resistor (ER) Cast within Sensor Head (Right). Generally, the longer the ER element is, the greater resistance it has. Since the resistivity of the tube steel is quite small, the resistance of ER element is difficult to measure if it has a short length. Thus, the length of ER is usually extended as long as possible to ensure the resistance is easy to measure with device of regular precision.

Figure 15:
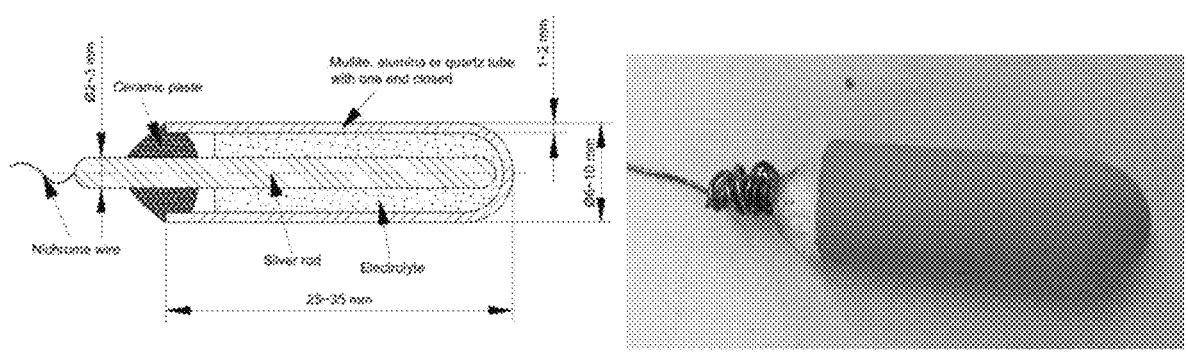
FIG. 15 shows a schematic of a longitudinal view of the reference electrode (RE) (left side of FIG. 15) and an example reference electrode body (right side of FIG. 15).

FIG. 15 Schematic of Reference Electrode (RE)—Longitudinal View (Left), Example Reference Electrode Body (Right). The drawing of the RE are shown as above. The particle size of the electrolyte powder is about 1 to 100 μm. The particle size is not critical because the powder will melt at the working temperature. The initial electrolyte powder particle ratios discussed are mass ratios. The ceramic paste used for casting is preferably silica or zirconia powder. The ceramic paste used for sealing the RE is preferably alumina paste. These ceramic paste and materials can be purchased from Aremco Company.

Figure 16:
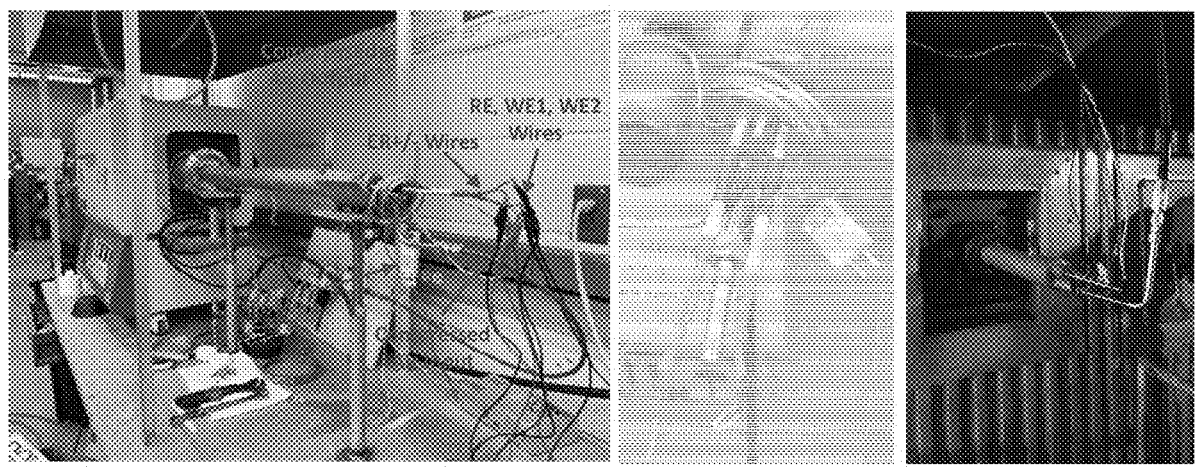
FIG. 16 shows a corrosion sensor (i.e. corrosion sensor probe) of this invention (left side of FIG. 16) and the close up of the rear probe input-output cables and tubing (middle of FIG. 16), and corrosion sensor tested in full scale boiler environment (right side of FIG. 16).

FIG. 16 shows the Corrosion Sensor Probe Tested in Lab (Left), Close-up of Rear Probe Input-Output Cables and Tubing (Middle), Probe Tested in Full-Scale Boiler Environment (Right).

TABLE 2

Commercial Off-The-Shelf Components Used in the Sensor Design

| Materials | Manufacturer | Model or Details |
|---|---|---|
| Ceramic casting powder | Aremco Co. | 645 |
| Ceramic paste | Aremco Co. | 544 |
| Nichrome wire | Surepure Chemetals | 4310 (0.02 inch diameter) |
| Silver rod | Surepure Chemetals | 5388 (0.079 inch diameter) |
| Mullite tube | Coorstek | 66632 (0.313 OD, 0.188 ID, one end closed) |
| $Al_2SO_4$ powder for electrolyte | Alfa Aesar | 12112 (Premion 99.999%) |
| $Na_2SO_4$ powder for eletrolyte | Alfa Aesar | 11560 (ACS, 99.0%) |
| Four-hole ceramic tube | AdValue Technology | AL-T4-N25-N062-48 (0.25 inch diameter) |
| Stainless steel tube | Mcmaster | 304 stainless steel, ⅜ inch |

Figure 17:
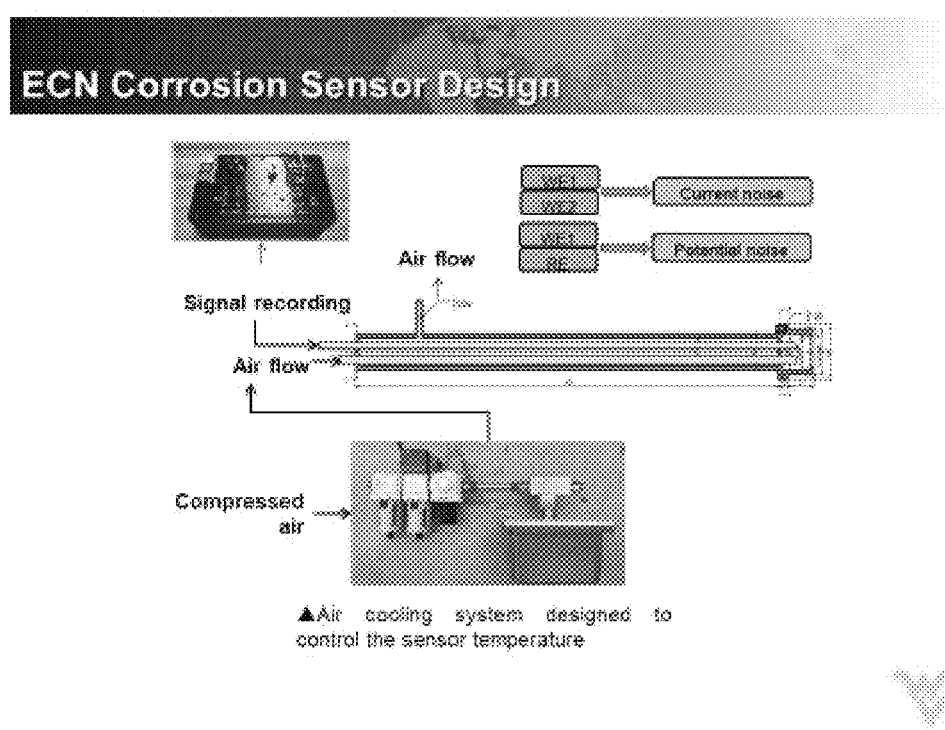
FIG. 17 shows a schematic of the air cooling system for controlling (adjusting) the corrosion sensor temperature.

FIG. 17 shows the air cooling system used to control the corrosion sensor temperature. The air flow rate is controlled by a temperature-based regulator according to the target sensor head temperature based on the exterior waterwall environmental temperature measured by an additional thermocouple (TC) that is not shown in FIG. 17. Usually the air flow rate is estimated to be 100 mL/s in present condition. The pressure of the compressed air source is about 120 psi. The target temperature of the sensor is usually 400-550° C. according to the operational practice in Longview. The outside environment temperature ranges from 1000° C. to 2000° C.

REFERENCES

[1] W. Y. Mok, J. Dougherty, V. Jovancicevic, Potentiostatic Electrochemical Noise for Corrosion Monitoring: General and Localized Corrosion, Corrosion, 2002, Paper No. 02335.

[2] Walterus. M. M. HuiJbregts, Andreas J. M. Primus, Corrosion probe, Pat. No. U.S. Pat. No. 6,568,251 B.

[3] B. Hedges, K. Sprague, T. Bieri, H. J. Chen, A Review of Monitoring and Inspection Techniques for $CO_2$ and $H_2S$ Corrosion in Oil and Gas Production facilities: Location, Location, Location, Corrosion, 2006, Paper No. 06120.

[4] F. Ansuini, NADC-SIRLAB-1089, p. 533-543

[5] A. J. Perkins, D. K. Waterman, A. L. Cheser, Electrical resistance temperature compensated corrosion probe with independent temperature measurement, Pat. No. U.S. Pat. No. 5,243,297A.

[6] Robert C. Hedtke, Charles R. Willcox, Corrosion rate measurement with multivariable sensor, Patent No. US10190968B2.

[7] Guy D. Davis, Chester M. Dacres, Electrochemical sensors for evaluating corrosion and adhesion on painted metal structures, Patent No. U.S. Pat. No. 5,859,537A.

[8] V. Agarwala, "Corrosion Monitoring of Shipboard Environments," in Degradation of Metals in the Atmosphere, ed. S. Dean and T. Lee (West Conshohocken, Pa.: ASTM International, 1987), 354-365. https://doi.org/10.1520/STP25863S

[9] N. N. Aung, X. Liu, High temperature electrochemical sensor for in situ monitoring of hot corrosion, Corros. Sci., 65(2012)1-4.

[10] Geng Hu, Zehua Dong, Xingpeng Guo, Zhenyu Chen, Couple electrochemical noise corrosion monitoring probe, Patent No. CN102128784.

[11] D. M. Farrell, W. Y. Mok, On-line monitoring of furnace-wall corrosion in a 125 MW power generation boiler, Mater. Sci. Eng. A, 121(1989) 651-659.

[12] G. Gao, F. H. Stott, J. L. Dawson, D. M. Farrell, Electrochemical monitoring of high-temperature molten-salt corrosion, Oxid. Met. 33 (1990)79-94.

[13] B. S. Covino Jr., S. J. Bullard, S. D. Cramer, G. R. Holcomb, Malgorzata Ziomek-Moroza, D. A. Eden, R.D. Kane, D.C. Kane, D.C. Eden, High temperature electrochemical corrosion rate probes for combustion environments, CORROSION/2004, NACE International 04528(2004)1-9.

[14] S. Mabbut, N. Simms, J. Oakey, High temperature corrosion monitoring by electrochemical noise techniques, Corros. Sci. Eng. Technol. 44(2009)186-195.

[15] W. M. Cox, Martin de Jong, KEMA Amhem, Real Time monitoring of corrosion and fouling in power generation boilers and waste to energy plants, CORROSION/2012 NACE International, Paper C2012-0001342(2012)1-15.

[16] N. N. Aung, X. Liu. Effect of temperature on coal ash hot corrosion resistance of Inconel 740 superalloy, Corros. Sci. 82(2014)227-238.

It will be appreciated by those persons skilled in the art that changes could be made to embodiments of the present invention described herein without departing from the broad inventive concept thereof. It is understood, therefore, that this invention is not limited by any particular embodiments disclosed, but is intended to cover the modifications that are within the spirit and scope of the invention, as defined by the appended claims.

What is claimed is:

1. A high temperature corrosion sensor comprising: (i) a housing having a first end and a second end and a middle section disposed between said first end of said housing and said second end of said housing, said housing having an external wall and an internal wall, said internal wall of said housing forming a chamber of said housing, and an airflow opening located on said external wall of said housing and extending through said internal wall of said housing and into said chamber, (ii) a stainless steel tube having a first open end and a second open end, and a middle section disposed between said first open end and said second open end of said stainless steel tube, wherein at least a portion of said stainless steel tube is located within said housing, (iii) a ceramic tube having a first open end and a second open end, and a middle section disposed between said first open end and said second open end of said ceramic tube, wherein said second end of said ceramic tube and said middle section of said ceramic tube is inserted into said first end of said stainless steel tube, through said middle section of said stainless steel tube, and through the second end of said stainless steel tube, such that the second end of said ceramic tube extends out of and beyond said second end of said stainless steel tube and wherein said first open end of said ceramic tube extends out of and beyond said first end of said stainless steel tube, and wherein said middle section of said ceramic tube is located within said middle section of said stainless steel tube, (iv) an airflow tube having a first open end and a second open end, and a middle section disposed between said first open end and said second open end of said air flow tube, wherein said second open end of said air flow tube extends through said first end of said housing, through said chamber of said housing, and into second end of said housing, and wherein said first end of said air flow tube is located outside of said external wall of said first end of said housing, and (v) a sensor probe located within said second end of said housing wherein said sensor probe comprises a first working electrode, a second working electrode, a reference electrode, a positive electrical resistance, a negative electrical resistance, and a thermocouple , wherein said thermocouple is inserted into a ceramic casting wherein said ceramic casting is located at the second end of said housing, and wherein said first working electrode is in communication with a first working electrode wire, wherein said second working electrode is in communication with a second working electrode wire, wherein said reference electrode is in communication with a reference electrode wire, wherein a positive electrical resistance wire is in communication with said first working electrode, wherein a negative electrical resistance wire is in communication with said second working electrode, and wherein a thermocouple wire is in communication with said thermocouple, and wherein a portion of each of said first working electrode wire, said second working electrode wire, said thermocouple wire, said positive electrical resistance wire, and said negative electrical resistance wire are located in an interior of said middle section of said ceramic tube.

2. The high temperature corrosion sensor of claim 1 wherein said reference electrode is a tube having a first closed end and a second end open, wherein said tube of said reference electrode contains an electrolyte and a silver rod inserted into said tube and surrounded by said electrolyte of said tube of said reference electrode, and wherein said second open end of said reference electrode tube is then sealed with a ceramic paste sealed in a vacuum.

3. The high temperature corrosion sensor of claim 2 wherein said electrolyte of said reference electrode is a mixture of a $Ag_2SO_4$ powder and a $Na_2SO_4$ powder.

4. The high temperature corrosion sensor of claim 2 wherein said tube of said reference electrode is made of a material selected from the group consisting of a mullite, an alumina, and a quartz.

5. The high temperature corrosion sensor of claim 2 wherein said ceramic paste for sealing said open end of said reference electrode is an alumina paste.

6. The high temperature corrosion sensor of claim 1 wherein said ceramic casting is made of one of a silica powder, or a zirconia powder, or a mixture of said silica powder and said zirconia powder.

7. The high temperature corrosion sensor of claim 1 wherein at least a portion of each of said first working electrode, said second working electrode, said reference electrode, and said thermocouple are within said ceramic casting.

8. The high temperature corrosion sensor of claim 1 wherein said ceramic casting encapsulates at least a portion of each of said first working electrode, said second working electrode, said reference electrode, and said thermocouple.

9. The high temperature corrosion sensor of claim 1 wherein each of said first working electrode wire, said second working electrode wire, said thermocouple wire, said positive electrical resistance wire, and said negative electrical resistance wire are made of a heat-resistant material.

10. The high temperature corrosion sensor of claim 9 wherein said heat-resistant material is a nichrome wire.

11. The high temperature corrosion sensor of claim 1 wherein said thermocouple has a thermocouple cap at one end to protect the thermocouple.

12. A high temperature corrosion sensor system comprising: (A) a high temperature corrosion sensor comprising (i) a housing having a first end and a second end and a middle section disposed between said first end of said housing and said second end of said housing , said housing having an external wall and an internal wall, said internal wall of said housing forming a chamber of said housing, and an airflow opening located on said external wall of said housing and extending through said internal wall of said housing and into said chamber, (ii) a stainless steel tube having a first open end and a second open end, and a middle section disposed between said first open end and said second open end of said stainless steel tube, wherein at least a portion of said stainless steel tube is located within said housing, (iii) a ceramic tube having a first open end and a second open end, and a middle section disposed between said first open end and said second open end of said ceramic tube, wherein said second end of said ceramic tube and said middle section of said ceramic tube is inserted into said first end of said stainless steel tube, through said middle section of said stainless steel tube, and through the second end of said stainless steel tube, such that the second end of said ceramic tube extends out of and beyond said second end of said stainless steel tube and wherein said first open end of said ceramic tube extends out of and beyond said first end of said stainless steel tube , and wherein said middle section of said ceramic tube is located within said middle section of said stainless steel tube, (iv) an airflow tube having a first open end and a second open end, and a middle section disposed between said first open end and said second open end of said air flow tube, wherein said second open end of said air flow tube extends through said first end of said housing, through said chamber of said housing, and into second end of said housing, and wherein said first end of said air flow tube is located outside of said external wall of said first end of said housing, and (v) a sensor probe located within said second end of said housing wherein said sensor probe comprises a first working electrode, a second working electrode, a reference electrode, a positive electrical resistance, a negative electrical resistance, and a thermocouple, wherein said thermocouple is inserted into a ceramic casting wherein said ceramic casting is located at the second end of said housing; (B) a temperature based airflow controller, and (C) a data collector comprising a voltmeter, an ammeter, a resistance meter, and a thermometer, and wherein said first working electrode is in communication with said voltmeter and said ammeter via a first working electrode wire, wherein said second working electrode is in communication with said ammeter via a second working electrode wire, wherein said reference electrode is in communication with said voltmeter via a reference electrode wire, wherein a positive electrical resistance wire is in communication with a first working electrode and said resistance meter, wherein a negative electrical resistance wire is in communication with said second working electrode and said resistance meter, and wherein a thermocouple wire is in communication with said thermocouple and said thermometer and said temperature based airflow controller, and wherein a portion of each of said first working electrode wire, said second working electrode wire, said thermocouple wire, said positive electrical resistance wire, and said negative electrical resistance wire are located in an interior of said middle section of said ceramic tube, and optionally (D) a source of compressed air in communication with said temperature based airflow controller and said first open end of said air flow tube.

13. The high temperature corrosion sensor system of claim 12 wherein said reference electrode is a tube having a first closed end and a second end open, wherein said tube of said reference electrode contains an electrolyte and a silver rod inserted into said tube and surrounded by said electrolyte of said tube of said reference electrode, and wherein said second open end of said reference electrode tube is then sealed with a ceramic paste sealed in a vacuum.

14. The high temperature corrosion sensor system of claim 13 wherein said electrolyte of said reference electrode is a mixture of a $Ag_2SO_4$ powder and a $Na_2SO_4$ powder.

15. The high temperature corrosion sensor system of claim 13 wherein said tube of said reference electrode is made of a material selected from the group consisting of a mullite, an alumina, and a quartz.

16. The high temperature corrosion sensor system of claim 13 wherein said ceramic paste for sealing said open end of said reference electrode is an alumina paste.

17. The high temperature corrosion sensor system of claim 12 wherein said ceramic casting is made of one of a silica powder, or a zirconia powder, or a mixture of said silica powder and said zirconia powder.

18. The high temperature corrosion sensor system of claim 12 wherein at least a portion of each of said first working electrode, said second working electrode, said reference electrode, and said thermocouple are within said ceramic casting.

19. The high temperature corrosion sensor system of claim 12 wherein said ceramic casting encapsulates at least a portion of each of said first working electrode, said second working electrode, said reference electrode, and said thermocouple.

20. The high temperature corrosion sensor system of claim 12 wherein each of said first working electrode wire, said second working electrode wire, said thermocouple wire, said positive electrical resistance wire, and said negative electrical resistance wire are made of a heat-resistant material.

21. The high temperature corrosion sensor system of claim 20 wherein said heat-resistant material is a nichrome wire.

22. The high temperature corrosion sensor system of claim 12 wherein said thermocouple has a thermocouple cap at one end to protect the thermocouple.

23. The high temperature corrosion sensor system of claim 12 wherein said source of said compressed air is an air compressor.

24. A method of measuring corrosion in a boiler comprising using a high temperature corrosion sensor system comprising: (A) inserting a high temperature corrosion sensor in an environment of a boiler, wherein said high temperature corrosion sensor comprises (i) a housing having a first end and a second end and a middle section disposed between said first end of said housing and said second end of said housing , said housing having an external wall and an internal wall, said internal wall of said housing forming a chamber of said housing, and an airflow opening located on said external wall of said housing and extending through said internal wall of said housing and into said chamber, (ii) a stainless steel tube having a first open end and a second open end, and a middle section disposed between said first open end and said second open end of said stainless steel tube, wherein at least a portion of said stainless steel tube is located within said housing, (iii) a ceramic tube having a first open end and a second open end, and a middle section disposed between said first open end and said second open end of said ceramic tube, wherein said second end of said ceramic tube and said middle section of said ceramic tube is inserted into said first end of said stainless steel tube, through said middle section of said stainless steel tube, and through the second end of said stainless steel tube, such that the second end of said ceramic tube extends out of and beyond said second end of said stainless steel tube and wherein said first open end of said ceramic tube extends out of and beyond said first end of said stainless steel tube , and wherein said middle section of said ceramic tube is located within said middle section of said stainless steel tube, (iv) an airflow tube having a first open end and a second open end, and a middle section disposed between said first open end and said second open end of said air flow tube, wherein said second open end of said air flow tube extends through said first end of said housing, through said chamber of said housing, and into second end of said housing, and wherein said first end of said air flow tube is located outside of said external wall of said first end of said housing, and (v) a sensor probe located within said second end of said housing wherein said sensor probe comprises a first working electrode, a second working electrode, a reference electrode, a positive electrical resistance, a negative electrical resistance, and a thermocouple, wherein said thermocouple is inserted into a ceramic casting wherein said ceramic casting is located at the second end of said housing, and providing (B) a temperature based airflow controller, and providing (C) a data collector comprising a voltmeter, an ammeter, a resistance meter, and a thermometer, wherein said voltmeter, said ammeter, said resistance meter, and said thermometer are each in communication with a computer processor, and wherein said first working electrode is in communication with said voltmeter and said ammeter via a first working electrode wire, wherein said second working electrode is in communication with said ammeter via a second working electrode wire, wherein said reference electrode is in communication with said voltmeter via a reference electrode wire, wherein a positive electrical resistance wire is in communication with a first working electrode and said resistance meter, wherein a negative electrical resistance wire is in communication with said second working electrode and said resistance meter, and wherein a thermocouple wire is in communication with said thermocouple and said thermometer and said temperature based airflow controller, and wherein a portion of each of said first working electrode wire, said second working electrode wire, said thermocouple wire, said positive electrical resistance wire, and said negative electrical resistance wire are located in an interior of said middle section of said ceramic tube, and optionally (D) providing a source of compressed air in communication with said temperature based airflow controller and said first open end of said air flow tube; and (E) measuring a level of corrosion within said boiler using said high temperature corrosion sensor system.

25. A method of measuring corrosion in pipes of a water-fall or super-heater of an electric power factory using a high temperature corrosion sensor system comprising: (A) inserting a high temperature corrosion sensor into the environment of one or more pipes of a water-fall or super-heater of an electric power plant, wherein said high temperature corrosion sensor comprises (i) a housing having a first end and a second end and a middle section disposed between said first end of said housing and said second end of said housing, said housing having an external wall and an internal wall, said internal wall of said housing forming a chamber of said housing, and an airflow opening located on said external wall of said housing and extending through said internal wall of said housing and into said chamber, (ii) a stainless steel tube having a first open end and a second open end, and a middle section disposed between said first open end and said second open end of said stainless steel tube, wherein at least a portion of said stainless steel tube is located within said housing, (iii) a ceramic tube having a first open end and a second open end, and a middle section disposed between said first open end and said second open end of said ceramic tube, wherein said second end of said ceramic tube and said middle section of said ceramic tube is inserted into said first end of said stainless steel tube, through said middle section of said stainless steel tube, and through the second end of said stainless steel tube, such that the second end of said ceramic tube extends out of and beyond said second end of said stainless steel tube and wherein said first open end of said ceramic tube extends out of and beyond said first end of said stainless steel tube, and wherein said middle section of said ceramic tube is located within said middle section of said stainless steel tube, (iv) an airflow tube having a first open end and a second open end, and a middle section disposed between said first open end and said second open end of said air flow tube, wherein said second open end of said air flow tube extends through first end of said housing, through said chamber of said housing, and into second end of said housing, and wherein said first end of said air flow tube is located outside of said external wall of said first end of said housing, and (v) a sensor probe located within said second end of said housing wherein said sensor probe comprises a first working electrode, a second working electrode, a reference electrode, a positive electrical resistance, a negative electrical resistance, and a thermocouple, wherein said thermocouple is inserted into a ceramic casting wherein said ceramic casting is located at the second end of said housing; and (B) providing a temperature based airflow controller, and (C) providing a data collector comprising a voltmeter, an ammeter, a resistance meter, and a thermometer, wherein said voltmeter, said ammeter, said resistance meter, and said thermometer are each in communication with a computer processor, and wherein said first working electrode is in communication with said voltmeter and said ammeter via a first working electrode wire, wherein said second working electrode is in communication with said ammeter via a second working electrode wire, wherein said reference electrode is in communication with said voltmeter via a reference electrode wire, wherein a positive electrical resistance wire is in communication with a first working electrode and said resistance meter, wherein a negative electrical resistance wire is in communication with said second working electrode and said resistance meter, and wherein a thermocouple wire is in communication with said thermocouple and said thermometer and said temperature based airflow controller, and wherein a portion of each of said first working electrode wire, said second working electrode wire, said thermocouple wire, said positive electrical resistance wire, and said negative electrical resistance wire are located in an interior of said middle section of said ceramic tube, and optionally (D) providing a source of compressed air in communication with said temperature based airflow controller and said first open end of said air flow tube; and (E) measuring a level of corrosion within at least of one said pipes of said water-fall or super-heater of said electric power factory using said high temperature corrosion sensor system.

* * * * *